United States Patent [19]

Easton et al.

[11] 4,130,967
[45] Dec. 26, 1978

[54] PRECISION GEAR CROWN GRINDING MACHINE

[75] Inventors: Ray D. Easton, Madison Heights; Phil F. Jakobi, Grosse Pointe Woods; Andrew L. Zabik, St. Clair Shores, all of Mich.

[73] Assignee: BJR Machine & Gear, Madison Heights, Mich.

[21] Appl. No.: 806,357

[22] Filed: Jun. 14, 1977

[51] Int. Cl.² .................. B24B 53/06; B24B 17/00
[52] U.S. Cl. .................. 51/5 D; 51/33 W; 51/100 R
[58] Field of Search .......... 51/5 D, 33 R, 33 W, 51/47, 52 R, 99, 100 R, 287, 95 GH; 90/2

[56] References Cited

U.S. PATENT DOCUMENTS

| | | | |
|---|---|---|---|
| 1,335,351 | 3/1920 | Segal | 51/100 R |
| 1,952,334 | 3/1934 | Robinson | 51/33 R |
| 2,015,495 | 9/1935 | Philippi | 51/100 R |
| 2,329,905 | 9/1943 | Huff | 51/100 R X |
| 2,392,819 | 1/1946 | Gruenberg | 51/287 X |
| 2,490,848 | 12/1949 | Vossler | 51/100 R |
| 3,605,334 | 9/1971 | Hahn | 51/5 D |

Primary Examiner—Gary L. Smith
Attorney, Agent, or Firm—Krass & Young

[57] ABSTRACT

A grinding machine for crowning of internal or external gears, including an indexing mechanism for supporting the gear so as to successively present each of the gear teeth to a gear crown grinding wheel which is supported so as to be moved through an arcuate path as it is drawn across the gear teeth so as to produce a crowning of each respective gear tooth. The arcuate movement of the grinding wheel is produced by a pivotal fixture having first arm extending toward the work holder on which the grinding wheel is mounted. The pivotal fixture is pivotally mounted on an adapter trunnion secured to the machine wheel head and having an opening concentric with and receiving the machine spindle for pivoting movement of the pivotal fixture about the axis of the machine spindle. A belt drive between the spindle and the grinding wheel provides rotative power to the grinding wheel while accommodating the pivotal movement. The movement of the pivoting fixture is controlled by a camming arrangement acting on a second arm extending in an opposing direction from the first arm.

21 Claims, 6 Drawing Figures

PRECISION GEAR CROWN GRINDING MACHINE

BACKGROUND OF THE INVENTION

1. Field of the Invention

This invention concerns grinding machines and more particularly gear grinding machines of the type specifically adapted to crown gear teeth.

2. Description of the Prior Art

Crowning of gear teeth is commonly done to improve the contact between meshing gears where some misalignment is anticipated since misaligned gears can produce a line contact between the mating gears increasing the tooth contact stress and thus also increasing wear and noise. The "Crowning" of gear teeth is the curving of the tooth flanks along their lengths. The usual approach in producing gear crowns as typified in the disclosure in U.S. Pat. No. 2,325,836 to Drummond is to cam the wheel head, i.e., that portion of the grinding machine in which the grinding wheel is supported so as to cause the grinding wheel to be moved toward or away from the gear teeth as the grinding wheel is moved across the gear teeth with grinding wheel being profiled so as to produce the appropriate crowning. This approach will generally be satisfactory for normal applications. However, for high precision crowning which is commonly required in such applications as aerospace components, the mass which is shifted during the camming translation of the wheel head levels inevitably to excessive deflections, backlash and other factors which in turn lead to relative inaccuracy and non-repeatability of results.

Some arrangements have also been provided in which the grinding wheel is mounted on a pivotal fixture, described in U.S. Pat. No. 2,490,848 to Vossler and No. 2,392,819 to Gruenberg et al., but these arrangements are not adapted to crowning of external and internal gears and in addition the mechanical arrangements disclosed also involve the movement of a considerable mass by virtue of the provision of a drive motor carried by the pivoted fixture. In addition, the mechanical arrangements disclosed involve numerous mating parts which lead to considerable clearance induced lost motion and excessive deflection such that high precision results are not likely using such apparatus.

A further problem in obtaining precision crownings is the inducement of minor vibrations created by an overhung grinding wheel mounted on a pivoted arm, which are accentuated by the support of relatively large masses on the pivotal frame and also the non-damping characteristics of the cast iron or steel material from which such components are manufactured. These vibrations would likewise adversely effect the precision with which the grinding process could be carried out.

Commonly, the gear crowning mechanisms which have been utilized in the past have entailed major modifications to the existing gear grinding machines and which in some instances the fixturing required must be removed in order to perform ordinary gear grinding processes. It would, of course, be advantageous if the gear grinding fixture could be provided which converts a conventional gear grinding machine into a machining which has a capability for high precision crowning operations and does not effect the ability of the machine to carry out normal gear grinding in which the wheel is drawn in a lineal path across the gear teeth.

It would, of course, also be advantageous if such fixturing could be provided which is of relative simple design such that it may be trouble-free and inexpensive to manufacture.

An additional drawback of some of the gear crowning mechanisms which have heretofore been utilized is that asymmetrical crowning cannot be obtained due to the nature of the crowning process. This drawback is inherent in those machines in which the gear is rocked as the grinding wheel passes along the length of the gear tooth. In many applications, such as in planetary gear sets, the ring gear is in overhung engagement with the pinion gears and, in this instance, the crowning would preferably be asymmetrical toward the position of the pinion gear and thus it would be desirable that any such gear crowning machine would have the capability of crowning the tooth flanks in any desired configuration.

Accordingly, it is an object of the present invention to produce a gear crown grinding machine which is capable of producing highly precise results by virtue of fixturing which produces a minimum deflection and vibration as the process is carried out, by reducing the mass which is moved during the crowning process and maximizing the rigidity of the parts by minimizing the number of mechanical elements which are stressed.

It is a further object of the present invention to provide a fixturing which may be relatively simply adapted to existing gear grinding machines to afford the same capability of carrying out precision crowning operations and also allowing the continued use of the gear grinding machine as a gear grinder.

It is yet another object of the present invention to provide such a machine in which vibrations of the fixturing is held to a minimum to further enhance the degree of precision obtainable.

It is yet another object of the present invention to provide such a machine in which gear crowning may be carried out on internal or external gears and in which the crowning shape may be formed asymmetrically with respect to the gear tooth length.

It is still another object of the present invention to provide an arrangement which is relatively simple in configuration and in its adaptation to existing gear grinding machines.

It is yet another object of the present invention to provide such a fixturing in which the friction forces involved are at a minimum to reduce deflections occurring in the fixturing as a result of frictional forces borne by the various structural components.

SUMMARY OF THE INVENTION

These and other objects, which will become apparent upon a reading of the following specification and claims, are accomplished by a fixturing including pivotal fixtures rotatably mounted on the wheel head frame and having a first arm on which is rotatably mounted the grinding wheel, the pivotal fixture being rotatably mounted and aligned with the axis of the machine spindle, with a flexible belt drive transmitting rotative power from the spindle to the grinding wheel. The pivotal fixture includes a second arm which carries a cam follower mechanism engaging a cam plate mounted on a slide rail which is drawn across the cam follower by means of a draw rod which is affixed to the work holder means and which supports the gear during the grinding process and which relatively moves with respect to the wheel head to produce the movement of the grinding wheel along the length of the gear tooth. The draw rod is threadably mounted so as to allow an adjustment in position such as to accurately relate the cam induced movement of the pivotal fixture with the location of the gear in the work holder. The pivotal fixture is spring-biased into engagement with the cam plate. The first arm is constructed of brass alloy to damp out slight vibrations induced by the dynamics of the grinding process. The slide rail is mounted in split ball bushings and stabilized by means of a lateral stabilizer bar carrying the cam plate which is positioned laterally by a plurality of rollers.

DETAILED DESCRIPTION

In the following detailed description, certain specific terminology will be utilized for the sake of clarity and a specific embodiment described in accordance with the requirements of 35 USC 112, but it is to be understood that the same is not intended to be limiting and should not be so construed inasmuch as the invention is capable of taking many forms within the scope of the appended claims.

Figure 1:
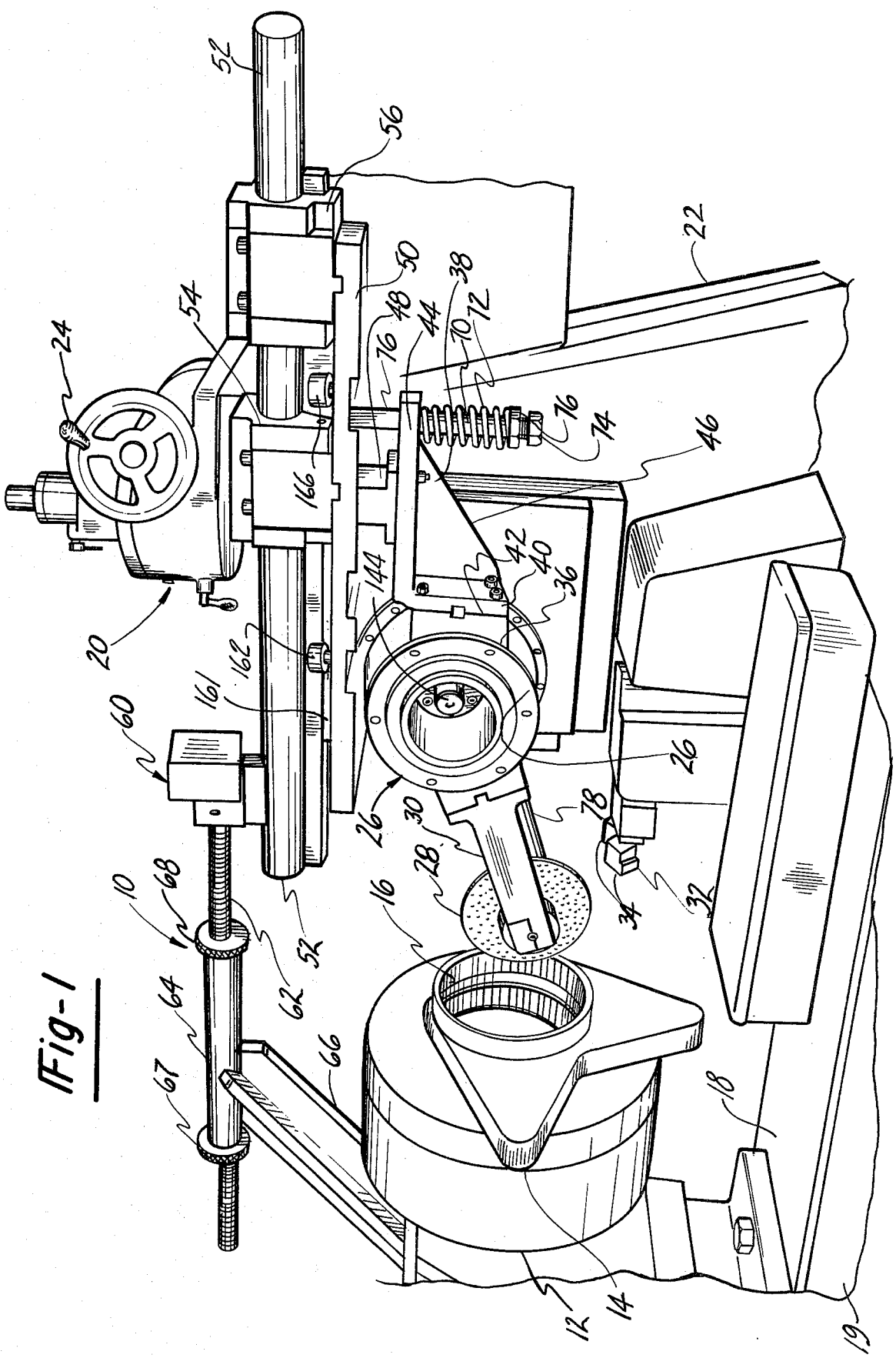
FIG. 1 is a partial perspective view of a grinding machine incorporating the gear crown fixturing according to the present invention.

Referring to the drawings, and particularly to FIG. 1, the grinding machine 10 according to the present invention, used as a gear crowning machine, includes a work holder means which is comprised of an indexing work holder 12 which is adapted to mount a workpiece 14 having gear teeth 16 formed thereon which are to be crowned. The indexing mechanism (not shown) is of conventional design and adapted to index the work holder mounting head 12 an angular increment corresponding to the teeth pitch as is well known to those of ordinary skill in the art. This indexing increment is of course adjustable to correspond to the particular gear pitch which is being machined. The grinding machine 10 also includes a wheel head frame 20 which is mounted for relative displacement with respect to the work holder 12 typically by the work holder 12 being mounted on the reciprocating table 18 mounted on the machine base 19 so as to advance the workpiece 14 towards and away from the wheel head frame 10 in order to carry out the grinding process. The wheel head frame 20 is vertically adjustable on a machine base 22 in the conventional manner with the traversing manual wheel 24 provided for this purpose.

According to the concept of the present invention, the wheel head frame 20 has a pivotal fixture 26 mounted thereto. This pivotal fixture 26 includes a grinding wheel 28 rotatably mounted on the free end of a first arm 30 of the pivotal fixture 26 about an axis displaced from the axis of the pivotal frame.

The grinding wheel 28 has a peripheral contour which is adapted to the gear pitch and form to be crowned thereby with a dressing mechanism 32 provided to periodically reshape the outer periphery of the grinding wheel 28 to the crowning profile desired.

The dressing mechanism 32 is adapted to be drawn across the periphery of the grinding wheel 28 by virtue of being mounted on the reciprocating table 18 so that it is moved to the left as viewed in FIG. 1, the dressing table surfaces 34 are drawn into dressing engagement therewith.

The first arm 30 is affixed to a rocker ring 36 which is rotatably mounted with respect to the wheel head frame 20 as will be described in detail hereinafter. Also affixed to the rocker ring 36 is a second arm 38 which takes the form of a bracket having a first plate 40, cap screwed as shown to a mounting surface 42 formed on the rocker ring 36 and a second plate 44 extending orthogally to the first plate 40 and reinforced with the gusset 46 in order to provide a rigid extension from the rocker ring 36. The grinding machine 10 includes cam actuation means, to be described in detail below, which produces oscillation of the pivotal fixture 26 about the axis of the machine spindle during infeeding movement of the wheel head frame 20 towards the work holder 12. This oscillation, in turn, produces a displacement of the grinding wheel 28 rotating on the first arm 30 which causes a deeper or shallower engagement of the grinding wheel 28 periphery with the gear teeth 16 to produce the crowning of the gear teeth 16. The precise shape of the arcuate path followed by the grinding wheel 28 periphery controls the configuration of the crowning produced, which arcuate path in turn depends on the oscillation produced by the cam actuation means.

Figure 3:
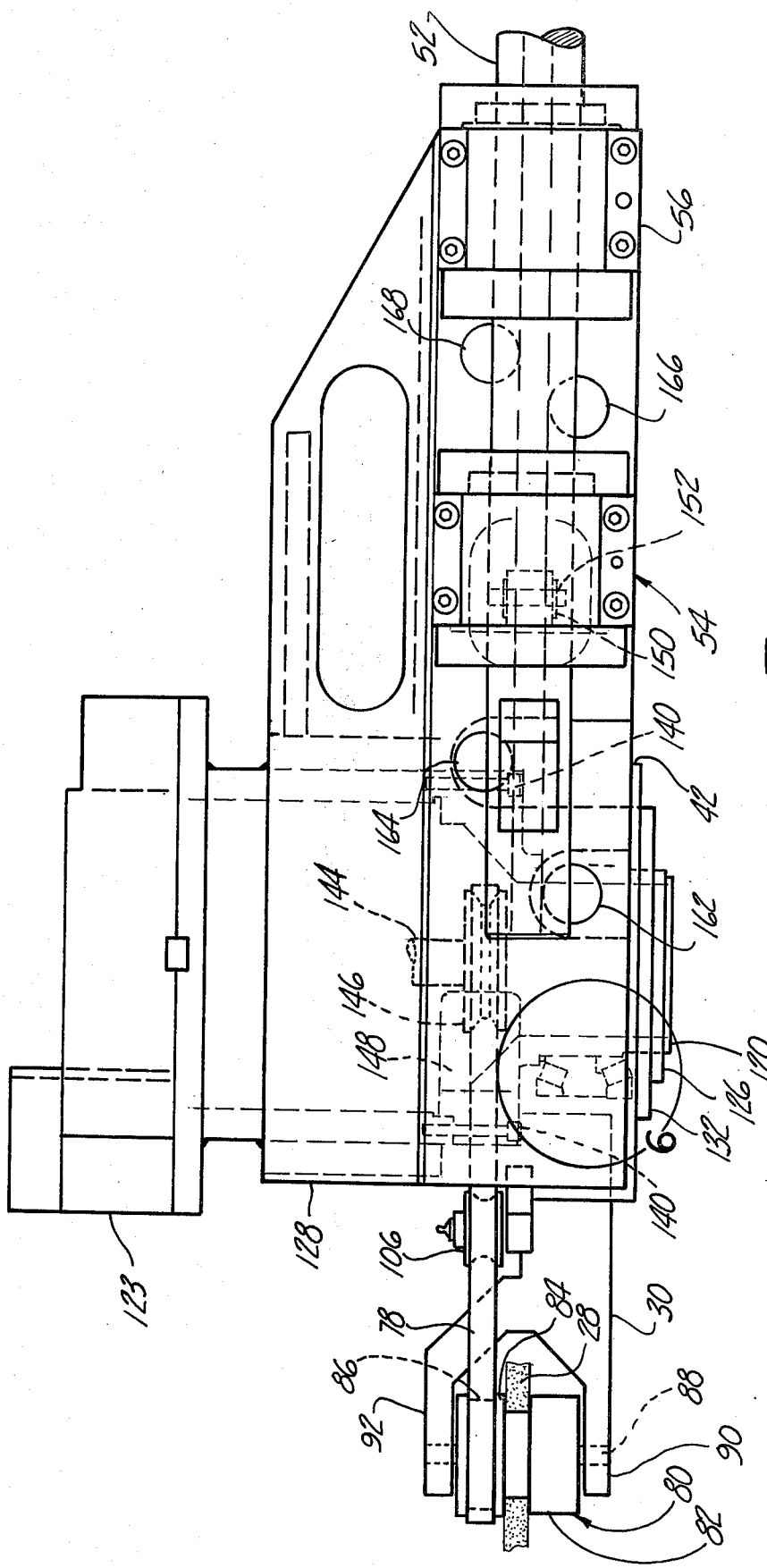
FIG. 3 is a plan view of the fixturing shown in FIG. 2.
Figure 4:
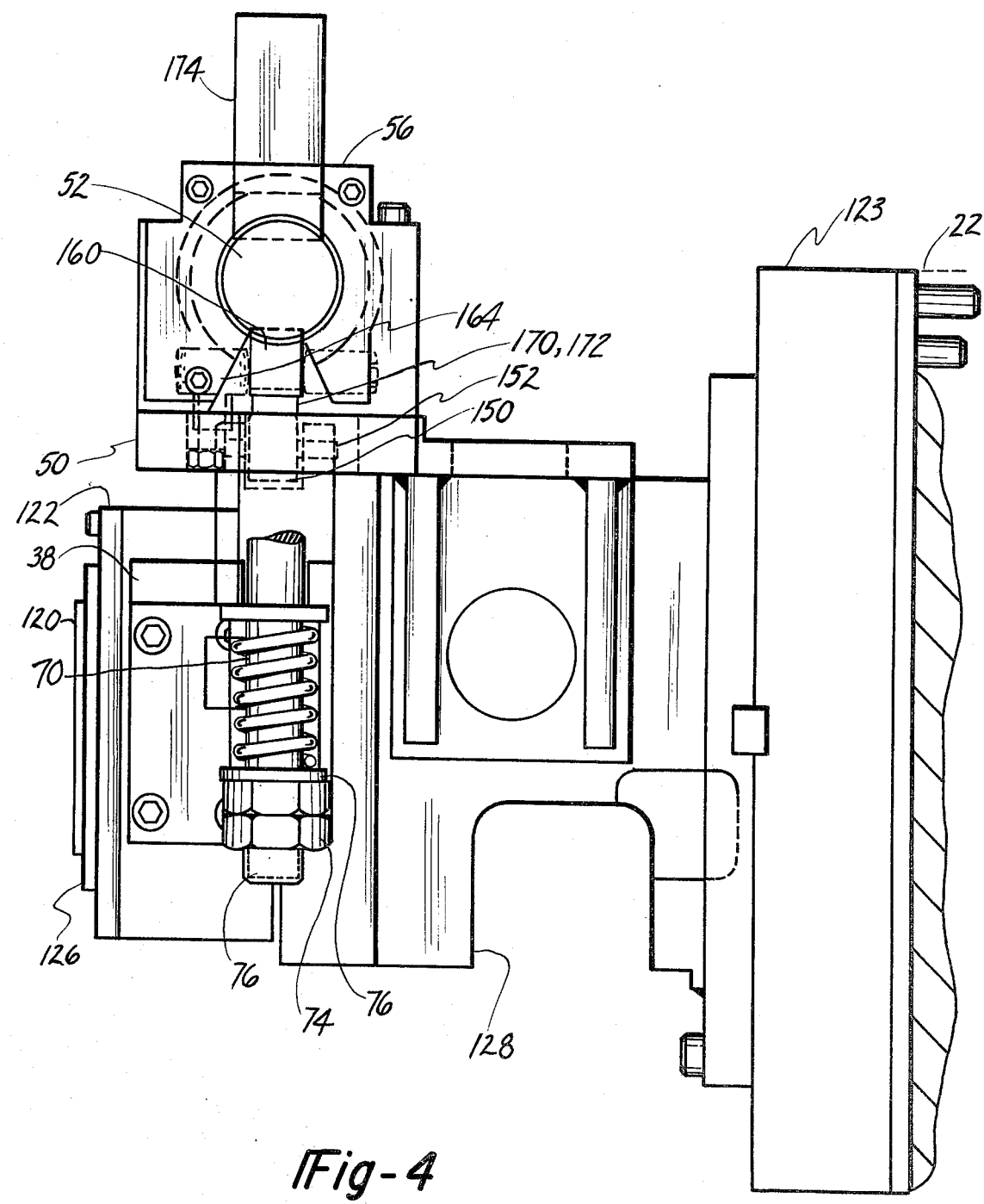
FIG. 4 is an endwise elevational view of the fixture shown in FIGS. 2 and 3.
Figure 5:
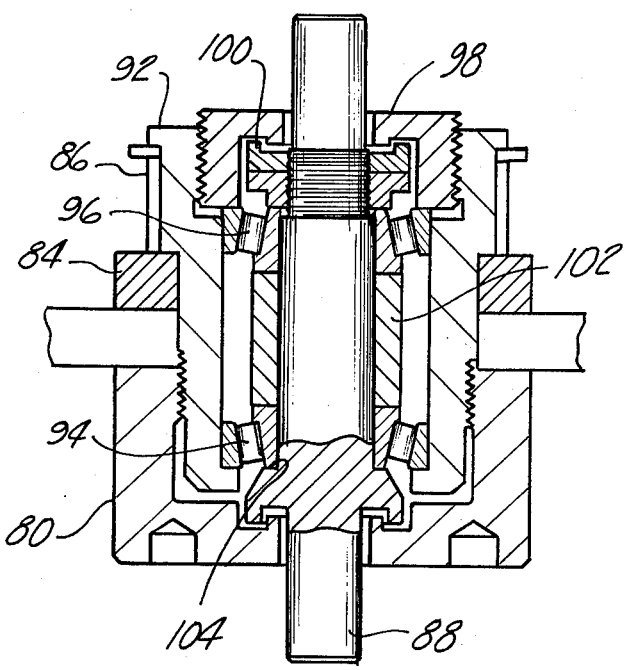
FIG. 5 is a view of the section 5—5 taken in FIG. 2.
Figure 6:
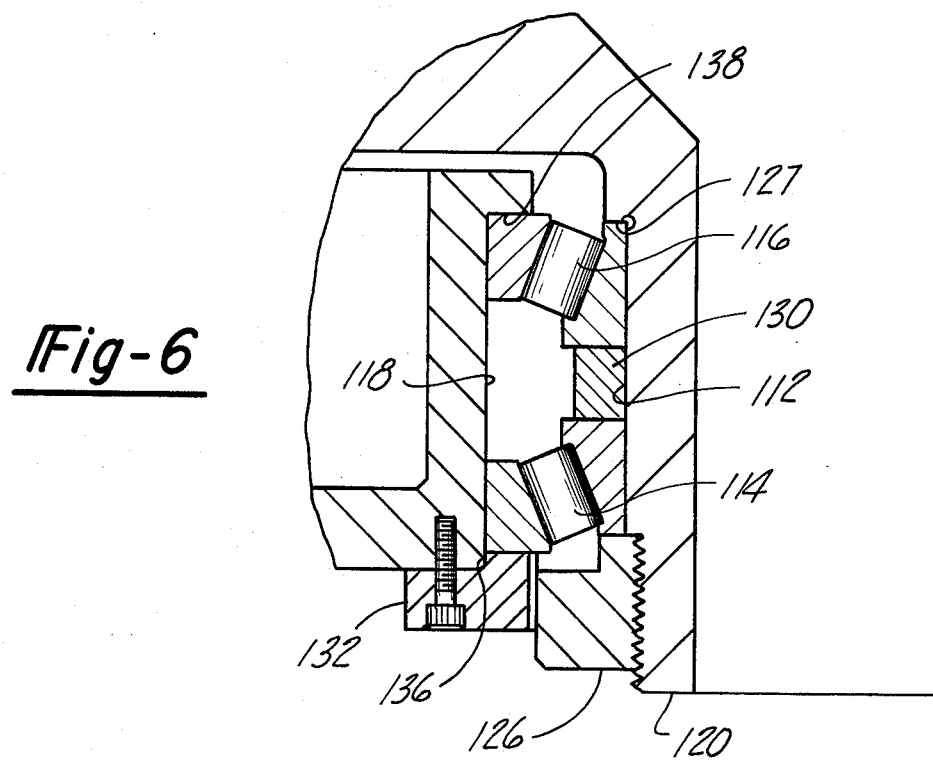
FIG. 6 is an enlarged sectional view of a portion of the fixturing shown in FIG. 3.

The cam actuation means acts on the second arm 38, and includes a cam follower mounted thereon. This mounting includes a cam follower pedestal mount 48 secured to the upper surface of the plate 44 as shown in FIG. 1 and extends up through a support plate 50 into engagement with a cam plate, to be described in detail with respect to FIGS. 2 through 4.

The cam plate is affixed to a slide rail 52 which is slidably mounted between ball bushing assemblies 54 and 56. The slide rail 52 is caused to moved together with the reciprocating table 18 by virtue of a pull rod assembly 58 including a clamping block connection 60 secured to the upper surface of the slide rail 52, a threaded pull rod 62 affixed to the clamping block 60 and captured within a tube 64 secured by means of bracketry 67 to the table 18. Threaded rings 66, 68 are locked in position on the threaded rod 62 and serve to locate the relative position of the work holder with respect to the slide rail and the cam (not shown) affixed thereto to closely and accurately correlate the oscillatory movement of the pivotal fixture 26 to the feeding motion produced by the reciprocating table 18. This of course allows precise control over the particular configuration of the crowning produced by the grinding wheel 28 as it is drawn over the gear teeth 16.

Thus, as the rotating grinding wheel 28 is drawn across the gear teeth 16, the cam mechanism carried on the slide rail 52 causes constrained movement of the pivotal fixture 26 to rock or oscillate about its rotational mount producing an up and down movement of the grinding wheel 28 with respect to the tooth flanks and produces the crowning of the contacted gear tooth flanks.

An upward bias force on the pivotal fixture 26 in the counterclockwise direction is provided so as to cause cam follower to be biased into engagement with the cam. This is produced by a rod 70 affixed to the plate 50 having a spring 72 mounted thereon and retained by means of a nut 74 and washer 76 urging the plate 74 upwardly as seen in FIG. 1.

The grinding wheel 28 is rotated by a driving connection with the machine spindle over which is mounted the pivotal fixture 26, the pivotal axis being aligned with the spindle axis. The driving connection is provided by a flexible element such as a belt drive 78 which extends about a hub affixed to the spindle and extending to a hub drivingly connected to the grinding wheel 28.

Reference is now had to FIGS. 2 through 6 which depict the details of the construction of the pivotal fixture 26 including the cam actuation means.

The first arm 30 affixed to the rocker ring 36 is constructed of a brass alloy which has internal damping characteristics such as to dissipate vibrations of the arm 30 and minimize inaccuracies which could arise from vibrations of the extending first arm 30 caused by rotation of the grinding wheel 28, movement of the belt 78 and engagement with the gear teeth 16.

The grinding wheel 28 is mounted on a hub 80 (FIG. 5) which includes a threaded retainer drum 82 and a retaining spring 84 abutting a belt hub which receives the belt 78. A central axle shaft 88 is affixed to bifurcations 90 and 92 formed on the end of the arm 30 with the hub 80, retaining ring 84 being received on a journal sleeve 92 which is rotatably mounted on the shafts 90 by means of bearings 94 and 96. The threaded retainer rings 100 and a spacer sleeve 102 insure proper location of the bearings 94 and 96 against the shoulder portion 104 machined on the shaft 88.

Idler pulley wheel 106 is mounted to the arm 30 along the length thereof with an adjustment bracket 108 provided to insure proper tensioning of the belt 78.

The first arm 30 is secured to the rocker ring 36 on a mounting flat 109 cooperating with the corresponding mounting flat 110 formed on the first arm 30 with a cap screw securement thereof as shown.

The rocker ring 36 is rotatably mounted (FIG. 6) by means of a pair of spaced bearings 114 and 116 which are received within the inside diameter of an opening 118 formed in the rocker ring and the outside diameter of a spindle adapter trunnion 122.

A threaded retainer ring 126 is threadably engaged with the end portion 120 of the adapter trunnion 122 and serves to axially locate the bearings 114 and 116 against the shoulder 128 with the cooperation of a spacer 130. The rocker ring 36 is retained axially by a cap 132 fastened with cap screws 134 to the end face of the rocker ring 36. The cap 132, having a shoulder 136 which seats on the bearing 114 serves to locate the rocker ring axially on the bearings 114 and 116 in cooperation with the shoulder 138 formed on the ID of the opening 118 formed in the rocker ring 36.

The adapter trunnion 122 is fastened with a series of cap screws 140 to an adapter bracket 142 which in turn is secured to the wheel head frame with a subplate 123. The adapter bracket 142 has a central opening aligned with the opening 118 formed in the rocker ring 36 and a central opening 121 formed in the adapter trunnion 122 which is in turn concentric with the existing spindle shaft 144 so as to receive the same by extending into the opening 121 in the adapter trunnion 122. The spindle 144 has affixed thereon a drive pulley 146 which receives the drive belt 78 which passes out through an opening 148 in the sidewall of the adapter trunnion 122 and into driving relationship with the hub 86 to provide the driving relationship of the spindle with the grinding wheel 28 as described above.

Figure 2:
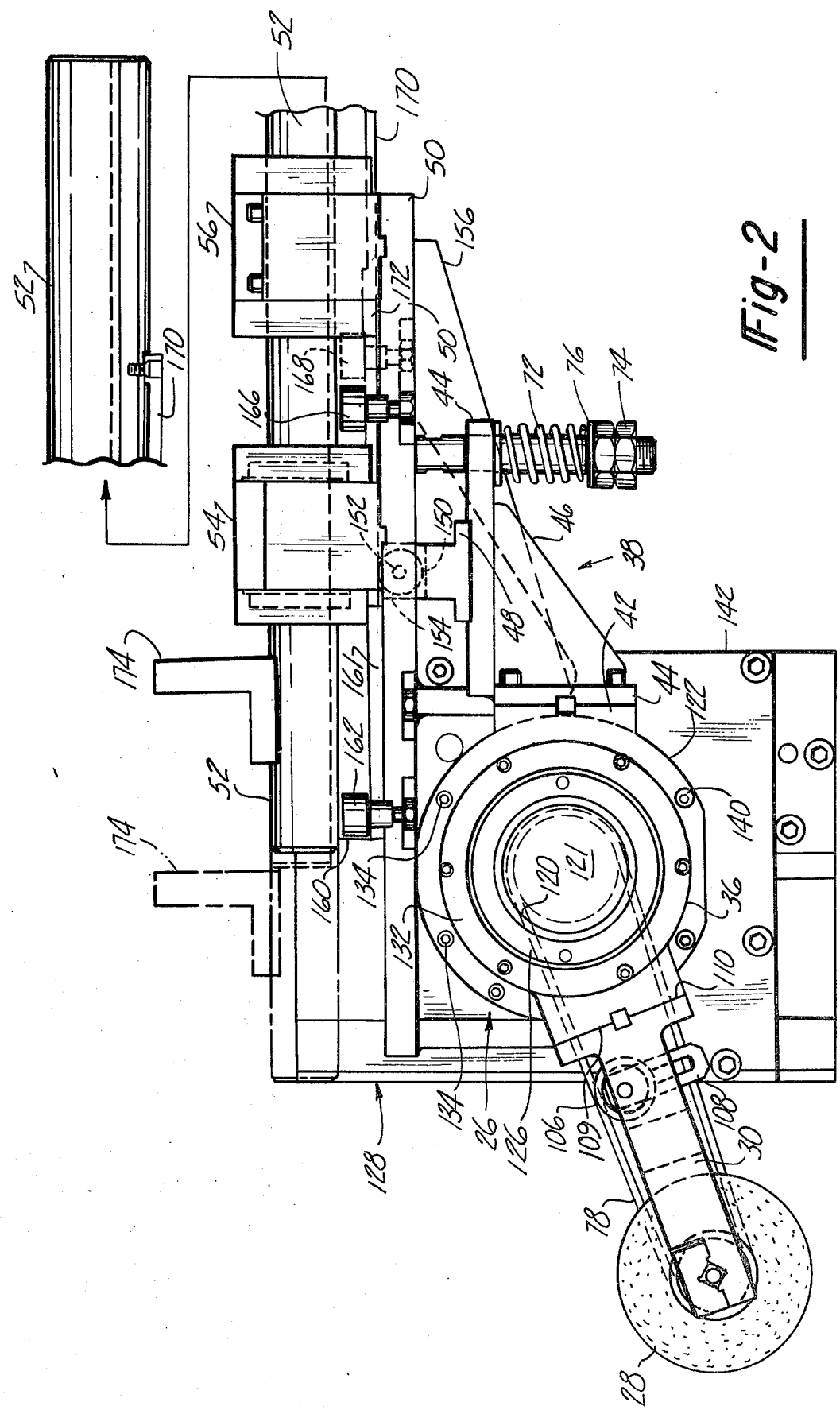
FIG. 2 is a front elevational view of the fixturing incorporated in the grinding machine shown in FIG. 1.

A second arm 38 as described above mounts to mounting surface 42 integral with rocker ring 36 and includes a mounting plate 44 and a support plate 46 reinforced with a gusset 44. The cam follower pedestal 48 is mounted to the upper surface of the horizontal support plate 44 and has a cam follower 150 mounted for rotation in the upper portion thereof as shown in FIG. 2, by an axle shaft 152 passing through a clevised end portion 154 of the cam follower pedestal mount 148.

The adapter bracket 142 has affixed thereto a base support plate 50, with a reinforcing gusset 156 provided. The base support plate 50 provides a mounting surface for the split ball bushings 54 and 56 which slidably support the slide rail 52. The slide rail 52 is of rounded cross section for this purpose and has a rectangular in section stabilizer bar 160 secured to its lower portion thereof and which is engaged by a plurality of rollers 160 and 162, 164 and 166 mounted to the base support plate 50 which act to maintain the slide bar rail 52 in the predetermined position with the transverse stabilizer bar 160 extending downwardly from the lower portion thereof. A way plate 161 engages the lower surface of the stabilizer bar in its extended position.

Affixed to the lower portion of the stabilizer bar 160 are cam plates 170 and 172. The cam plate 172 is in engagement with the cam follower 150 during the infeed of grinding wheel 28 into engagement with the gear teeth 16 and accordingly the contour of the cam plate 172 controls the oscillation of the pivotal fixture 28 and the particular crowning configuration which is carried out on the gear 14.

The cam plate 170 on the other hand is engaged by the cam follower 150 during extension of the reciprocating table 13 such as to bring the grinding wheel into engagement with the dresser mechanism 32 and accordingly is formed with a flat surface.

To maintain the position of the pivotal fixture 26 stationary in the event the fixture is used for straight grinding of the gear teeth, a flat plate could be substituted for the cam plate 172 so as to eliminate oscillatory motion of the pivotal fixture 126 during grinding of the gear tooth contour.

A bracket 174 is provided to mount the clamping block 60 thereto.

Accordingly, it can be seen that by providing a drive to the grinding wheel 28 by means of a belt drive, accommodates the oscillatory movement of the arm and does not require the drive motor to be carried on the pivotal fixture 126 as distinguished from the arrangement described above. The parts in the pivotal fixture 26 are arranged to produce a minimum deflection and friction in the structural components transmitting motion from the cam follower 150 to the first arm 30 and the grinding wheel 28, but at the same time the design involves relatively low mass of the parts moved during the oscillation of the pivotal fixture 26.

The provision of the slide bearings reduces friction to a minimum as does the anti-friction bearings used to mount the pivotal fixture 26 for rotation or oscillation.

The machine 10 is also readily adaptable to regular gear forming operations as described above and is adaptable to either internal or external gear grinding and by simply changing the cam plate 172, any asymmetrical or symmetrical crowning configuration may be readily obtained.

Further, it can be seen that the provision of the brass composition of the first arm 30 tends to damp out the minor vibrations which may be produced by the running of the spindle and the associated drive belt hubs as well as the machine process such that the performance of the unit has been found to be extremely accurate and perfectly repeatable from workpiece to workpiece. This has been accomplished without any excessively complex or costly design features using relatively simple mechanical components which are obtainable or may by fabricated at relatively low cost so that the unit itself is relatively low in cost to manufacture. Additionally, no major modification need be done to the existing machinery to similarly keep the cost of conversion at modest levels.

The embodiments of the invention in which an exclusive property or privilege is claimed are defined as follows:

1. A gear crowning machine comprising:
   a machine base;
   a work holder means adapted to mount a gear therein, said work holder means including an indexing head intermittently rotating said gear mounted therein through an angular displacement corresponding to the gear tooth pitch;
   a wheel head frame mounted on said machine base for relative displacement towards and away from said work holder means;
   a pivotal fixture and means mounting said pivotal fixture on said wheel head frame for pivoting rotation about an axis orthogonal to said longitudinal axis of said work holder means, said pivotal fixture including a first arm extending from said pivoting rotation axis and towards said work holder means;
   a grinding wheel rotatably mounted on the free end of said first arm;
   means for rotating said grinding wheel;
   said pivotal fixture further including a second arm extending from said axis of pivotal rotation and cam actuation means drivingly engaging said second arm, said relative displacement of said work holder means and said wheel head frame causing constrained movement of said pivotal fixture to rotate about said means mounting said pivotal fixture on said wheel head frame;
   whereby said grinding wheel periphery may be moved through an arcuate path during said relative displacement of said wheel head by said rotation of said pivotal fixture.

2. The gear crowning machine according to claim 1 wherein said cam actuation means includes a slide rail having a cam plate affixed to said slide rail and also including a rod connected to said slide rail and to said work holder frame whereby said cam means is reciprocated by relative displacement of said work holder means and said wheel head means.

3. The gear crowning machine according to claim 1 wherein said means for rotating said grinding wheel comprises a slindle, said spindle extending concentric to said axis of pivotal mounting of said pivotal fixture, and further includes drive means extending from said spindle to said means pivotally supporting said grinding wheel on said first arm.

4. The gear crowning machine according to claim 3 wherein said drive means includes a flexible element passing about said spindle axis and said axis of rotation of said grinding wheel.

5. The gear crowning machine according to claim 1 wherein said first arm is constructed of brass whereby vibrations of said first arm are attenuated.

6. The gear crowning machine according to claim 2 wherein said slide rail comprises a rounded shaft supported for sliding movement by means including a pair of spaced bushings slidably supporting said rounded shaft.

7. The gear crowning machine according to claim 6 further including a lateral stabilization bar fixed with respect to said rounded shaft and further including spaced roller means engaging said lateral stabilization bar on either side thereof during sliding of said shaft whereby said cam plate is maintained in precise orientation throughout said sliding movement of said rounded shaft.

8. The gear crowning machine according to claim 6 wherein said cam actuation means is disposed above said pivotal axis of said pivotal fixture and further includes a cam follower carried by said second arm, said cam actuation means further including means biasing said pivotal fixture about said means mounting said pivotal fixture to cause engagement of said cam follower means with said cam plate.

9. The gear crowning machine according to claim 8 wherein said means biasing said pivotal arm includes spring-biasing means engaging said second arm and resiliently biasing said arm upwardly to cause said cam follower means to be engaged with said cam plate.

10. The gear crowning machine according to claim 3 wherein said means pivotally mounting said pivotal fixture comprises an adapted trunnion secured to said wheel head and having a central opening receiving said spindle, said pivotal fixture being rotatably mounted on said adapter trunnion.

11. The gear crowning machine according to claim 4 wherein said means pivotally mounting said pivotal fixture comprises an adapter trunnion secured to said wheel head and having a central opening receiving said spindle, said pivotal fixture being rotatably mounted on said adapter trunnion and wherein said adapter trunnion is formed with an opening through which said flexible element extends from said spindle.

12. The gear crowning machine according to claim 2 further including a wheel dressing means adapted to engage said grinding wheel periphery upon continued relative displacement of said wheel head and said work holder means and further including a dressing cam plate affixed to said slide rail adapted to be engaged by said cam follower when said dressing means is in engagement with said dresser means, and positioning said pivotal fixture for engagement of said grinding wheel with said dressing mechanism. 1

13. In a grinding machine of this type including:
   a machine base;
   a work holder means adapted to mount a gear therein, said work holder means including an indexing head intermittently rotating said gear mounted therein through an angular displacement corresponding to the gear tooth pitch;
   a wheel head frame, said work holder means and wheel head frame mounted on said machine base for relative displacement toward and away from each other to carry out grinding of said workpiece;
   a wheel head spindle rotatably mounted in said wheel head frame; and a grinding wheel;

in combination, fixturing for the crowning of gear teeth;

means mounting said grinding wheel on said wheel head displaced from the axis of said spindle including:

a pivotal fixture;

an adapter trunnion;

means mounting said adapter trunning over said spindle;

means mounting said pivotal fixture on said adapter trunnion for rotation about an axis aligned with said spindle;

means rotationally mounting said grinding wheel on said pivotal fixture about an axis displaced from said spindle axis;

drive means drivingly connecting said spindle and said grinding wheel to produce rotation of said grinding wheel by said spindle;

and camming means drivingly engaged with said pivotal fixture constraining said pivotal fixture to rotate on said adapter trunnion as said grinding wheel is displaced to engage said workpiece.

14. The grinding machine according to claim 13 wherein said pivotal fixture including a rocker ring rotationally mounted on said adapter trunnion and further includes a first arm fixed to said rocker ring and extending from said rocker ring toward said work holder means and wherein said means rotationally mounting said grinding wheel on said pivotal fixture rotationally mounts said grinding wheel on said first arm.

15. The grinding machine according to claim 14 further including a second arm affixed to said rocker ring and extending therefrom, futher means positioning said pivotal fixture on said adapter trunnion including means carried by said second arm.

16. The grinding machine according to claim 15 wherein said means positioning said pivotal fixture on said adapter trunnion includes cam actuation means including a cam follower carried on said second arm further includes a cam plate means and slide rail means on which said cam plate is mounted and means drawing said slide rail past said cam follower means as said work holder and said wheel head frame are displaced relative to each other whereby said cam follower positions said pivotal fixture on said adapter trunnion.

17. The grinding machine according to claim 16 further including a bias means exerting a biasing force on said pivotal fixture tending to force said cam follower means into engagement with said cam plate.

18. The grinding machine according to claim 14 wherein said first arm is constructed of brass.

19. The grinding machine according to claim 13 wherein said means drivingly connecting said grinding wheel and said spindle comprises a flexible element extending around said spindle axis and said grinding wheel axis.

20. The grinding wheel according to claim 19 wherein said adapter spindle has an opening formed therein, said flexible element extending through said opening.

21. The grinding machine according to claim 19 wherein said slide wheel comrpises a rounded shaft supported within a pair of spaced bushings slidably supporting said rounded shaft.

* * * * *